US011009292B2

(12) United States Patent
Zeine (10) Patent No.: US 11,009,292 B2
(45) Date of Patent: May 18, 2021

(54) SYSTEMS FOR EXTRACTING OXYGEN FROM A LIQUID

(71) Applicant: Zeine, Inc., Bellevue, WA (US)

(72) Inventor: Hatem I. Zeine, Woodinville, WA (US)

(73) Assignee: Zeine, Inc., Bellevue, WA (US)

( * ) Notice: Subject to any disclaimer, the term of this patent is extended or adjusted under 35 U.S.C. 154(b) by 598 days.

(21) Appl. No.: 15/439,260

(22) Filed: Feb. 22, 2017

(65) Prior Publication Data
US 2017/0241708 A1    Aug. 24, 2017

Related U.S. Application Data

(60) Provisional application No. 62/299,286, filed on Feb. 24, 2016.

(51) Int. Cl.
*F25J 3/04* (2006.01)
*C01B 13/02* (2006.01)
(Continued)

(52) U.S. Cl.
CPC ......... *F25J 3/04636* (2013.01); *B03C 1/0332* (2013.01); *B03C 1/288* (2013.01);
(Continued)

(58) Field of Classification Search
CPC .. F25J 3/04636; F25J 3/04163; F25J 3/04024; F25J 2230/20; F25J 2230/08;
(Continued)

(56) References Cited

U.S. PATENT DOCUMENTS 1,056,043 A * 3/1913 Morrison ................ C02F 1/481
210/695
1,146,020 A    7/1915 Place
(Continued)

FOREIGN PATENT DOCUMENTS

CN      203771902 U    8/2014
JP      63-264155 A    11/1988
(Continued)

OTHER PUBLICATIONS

European Patent Application No. 17757184.1, Extended European Search Report, 10 pages, dated Sep. 5, 2019.
(Continued)

*Primary Examiner* — Ljiljana V. Ciric (57) ABSTRACT

A system for extracting oxygen from a liquid includes a separator allowing a liquid to pass lengthwise through the separator to produce a liquid mixture with the liquid having at least a portion of oxygen removed from the liquid. The separator includes a wall surrounding an interior portion of a tube. The wall has at least one aperture formed in the wall. The separator also includes at least one magnet positioned adjacently to the at least one aperture. The magnet has a north pole end and a south pole end. A magnetic field gradient is formed between the north pole end and the south pole end, and extends into an interior portion of the tube. The system also includes a storage tank fluidly coupled to the at least one aperture for storing the at least a portion of the oxygen removed from the liquid via the separator.

6 Claims, 6 Drawing Sheets

(51) Int. Cl.
  *B03C 1/033* (2006.01)
  *B03C 1/30* (2006.01)
  *B03C 1/28* (2006.01)

(52) U.S. Cl.
  CPC ............ *B03C 1/30* (2013.01); *C01B 13/0248* (2013.01); *F25J 3/04024* (2013.01); *F25J 3/04163* (2013.01); *B03C 2201/16* (2013.01); *F25J 2205/86* (2013.01); *F25J 2210/40* (2013.01); *F25J 2215/50* (2013.01); *F25J 2230/08* (2013.01); *F25J 2230/20* (2013.01)

(58) Field of Classification Search
  CPC .. F25J 2215/50; F25J 2210/40; F25J 2205/86; B03C 1/30; B03C 1/0332; B03C 1/288; B03C 2201/16; C01B 13/0248
  See application file for complete search history.

(56) References Cited

U.S. PATENT DOCUMENTS

| | | | |
|---|---|---|---|
| 1,426,461 A | | 8/1922 | Claude |
| 1,546,632 A | | 7/1925 | Dow et al. |
| 1,722,458 A | * | 7/1929 | De Baufre ............ B01D 53/14 95/174 |
| 1,976,336 A | | 10/1934 | Eichelman |
| 2,149,764 A | * | 3/1939 | Frei ...................... B03C 1/0332 210/223 |
| 3,186,929 A | * | 6/1965 | Rippie ................... B01J 19/087 204/155 |
| 3,762,133 A | * | 10/1973 | Merriman ............. B01D 53/14 95/163 |
| 4,049,398 A | * | 9/1977 | Vaseen .................. B01D 53/00 95/28 |
| 4,142,874 A | * | 3/1979 | Vaseen .................. B01D 19/00 95/186 |
| 4,150,956 A | * | 4/1979 | Vaseen .................. B03C 1/288 95/28 |
| 4,203,740 A | | 5/1980 | Vaseen |
| 4,217,213 A | * | 8/1980 | Schuster ................ B03C 1/033 210/223 |
| 4,261,711 A | * | 4/1981 | Vaseen .................. B03C 1/025 96/1 |
| 4,343,707 A | * | 8/1982 | Lucas .................... B01D 21/26 210/695 |
| 4,382,866 A | * | 5/1983 | Johnson ................ B01D 35/06 210/243 |
| 4,704,139 A | * | 11/1987 | Yamamoto ............ B01D 53/22 128/205.11 |
| 4,769,130 A | * | 9/1988 | Christensen ............ B03C 1/032 209/223.1 |
| 4,772,383 A | | 9/1988 | Christensen |
| 4,816,143 A | * | 3/1989 | Vollmar .................. B03C 1/035 209/212 |
| 5,366,623 A | * | 11/1994 | Clair ....................... C02F 1/482 166/66.5 |
| 5,443,719 A | * | 8/1995 | Johnson ................ B01D 35/06 210/101 |
| 5,622,622 A | * | 4/1997 | Johnson .................... A61L 2/02 210/192 |
| 5,779,892 A | | 7/1998 | Miltenyi |
| 6,159,271 A | * | 12/2000 | Tillotson ................ B64G 1/402 210/222 |
| 6,361,749 B1 | * | 3/2002 | Terstappen ............ B03C 1/0332 209/214 |
| 6,740,245 B2 | * | 5/2004 | Johnson ............. B01D 21/0003 204/157.46 |
| 7,740,759 B2 | * | 6/2010 | Su ........................... B03C 1/288 210/222 |
| 7,771,509 B1 | | 8/2010 | Brown |
| 10,357,780 B2 | * | 7/2019 | Kang ................ G01N 33/54366 |
| 10,894,728 B2 | * | 1/2021 | Batkin, III ............ B01F 5/0413 |
| 2004/0020835 A1 | * | 2/2004 | Chang ..................... B03C 1/286 210/222 |
| 2007/0246430 A1 | * | 10/2007 | Chau ....................... C02F 1/48 210/695 |
| 2012/0080360 A1 | * | 4/2012 | Stone ..................... B03C 1/288 209/214 |
| 2013/0233440 A1 | | 9/2013 | Holder |
| 2014/0013950 A1 | * | 1/2014 | Inoue ...................... B03C 1/30 96/1 |
| 2017/0241708 A1 | * | 8/2017 | Zeine ..................... B03C 1/288 |
| 2018/0178184 A1 | * | 6/2018 | Holland ................. B03C 1/0355 |
| 2019/0001343 A1 | * | 1/2019 | Grebenuk ............. B03C 1/286 |

FOREIGN PATENT DOCUMENTS

| | | |
|---|---|---|
| JP | 5-220484 A | 8/1993 |
| JP | 2011-501989 A | 1/2011 |
| JP | 2013-59749 A | 4/2013 |

OTHER PUBLICATIONS

Japanese Patent Application No. 2018-545367, Office Action, 8 pages, dated Oct. 29, 2019.

Ueno, S. and Harada, K.; Redistribution of Dissolved Oxygen Concentration Under Strong DC Magnetic Fields; IEEE Transactions on Magnetice. vol. 18, No. 6, Nov. 1982.

Iacob, G. et al.; High Gradient Magnetic Separation Ordered Matrices; European Cells and Materials. vol. 3, Suppl 2, 2002.

* cited by examiner

SYSTEMS FOR EXTRACTING OXYGEN FROM A LIQUID

RELATED APPLICATIONS

This application hereby claims the benefit of and priority to U.S. Provisional Patent Application 62/299,286, titled "SYSTEM AND A METHOD TO EXTRACT OXYGEN FROM AIR," filed Feb. 24, 2016, and which is hereby incorporated by reference in its entirety.

TECHNICAL FIELD

Aspects of the disclosure are related to oxygen extraction and more particularly to extracting oxygen from air.

TECHNICAL BACKGROUND

Pure oxygen is useful in many ways. Fields that benefit from the use of pure oxygen include, for example, the medical field, sports and recreational fields, and the industrial field. Pure oxygen, however, is not readily available as a direct source but must instead be extracted from other sources including oxygen. There are various ways to capture or extract pure oxygen from such other sources. Extracting oxygen has typically been expensive and can require a complex setup that limits the supply of oxygen in various industries and fields.

In non-cryogenic extraction methods, process such as adsorption, chemical processing, polymeric membranes, and ion transport membranes may be used. In the adsorption method, a material made up of special compounds is used that has unique capabilities for adsorbing certain gases such as oxygen, thus removing that gas from a mixture of other gases. The adsorption method does not entail a chemical change in the material, thus allowing for reversible process. However, the complete removal of a specific gas using this process is difficult to achieve with great certainty. Since the process is reversible, an equilibrium state is achieved where the target gas starts flowing out of the adsorbing material.

By utilizing certain chemical approaches, it is possible to react with the gases and remove certain chemicals directly. This approach can be very effective to achieve 100% purity, since the chemical reaction will keep on happening given enough reactant and sufficient reactive area. Thus, the gas can be completely removed. However, chemical separation approaches can be quite complex to implement and do not currently present meaningful market share. Furthermore, creating continuous systems based on chemical approaches is difficult.

By filtering air through a permeable membrane such that the membrane has higher permeability to oxygen than another gas (such as nitrogen), the concentration of oxygen can be increased by trapping or filtering the other, larger gas. This technique, however, does not typically achieve a high purity in the target gas because, as a separator, the filter will allow gases that are more permeable than the target gas to pass through unimpeded. Thus, the resultant gas includes a mixture of all of the gases more permeable than what the filter can remove.

The ion transport membrane method uses hot liquid gases (that would ionize oxygen) passing over special (ceramic) membranes that allow the oxygen ions to pass through and recombine to create pure oxygen. However, while this process can achieve pure oxygen, it uses high energy costs for heating and for recompressing the recombined oxygen.

In one cryogenic extraction method, by utilizing pressure and centrifuges, it is possible to separate oxygen from air without liquefaction. However, this process suffers from high energy costs and complex equipment.

Another cryogenic extraction method takes advantage of the fact that at a certain pressure, every gas has a separate boiling temperature. By gradually reducing the pressure (i.e., relieving the pressure) from on outlet of a liquid air container, every gas will take its turn to exit the tank according to its boiling temperature. This approach is effective at separating all types of gases from each other, but suffers from energy losses at many stages and that the process cannot be done in a continuous mechanism, requiring staging of separate lines for compressing and separation.

Thus, it would be advantageous to utilize a system of extracting pure oxygen from air that overcomes the aforementioned drawbacks.

OVERVIEW

In one example, a system for extracting oxygen from a liquid comprises a separator configured to allow a liquid to pass therethrough and to produce a liquid mixture comprising the liquid having at least a portion of oxygen removed therefrom. The separator comprises a wall surrounding an interior portion of a tube, the wall having at least one aperture formed therein. The separator also comprises at least one magnet positioned adjacently to the at least one aperture, the at least one magnet having a north pole end and a south pole end forming a magnetic field gradient therebetween and extending into an interior portion of the tube. The system also comprises a storage tank fluidly coupled to the at least one aperture and configured to store the at least a portion of oxygen removed from the liquid via the separator.

In another example, method of extracting oxygen from liquid air comprises extracting oxygen from liquid air to produce a liquid mixture comprising the liquid air having at least a portion of the oxygen extracted therefrom via passing the liquid air through a separator. The separator includes a wall surrounding an interior portion of a tube, the wall having at least one aperture formed therein. The separator also includes a magnet assembly positioned adjacently to the at least one aperture, the magnet assembly having a north pole and a south pole forming a magnetic field gradient between the north and south poles, wherein the magnetic field gradient extends into an interior portion of the tube. The method further comprises storing the extracted oxygen in a storage tank fluidly coupled to the at least one aperture.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
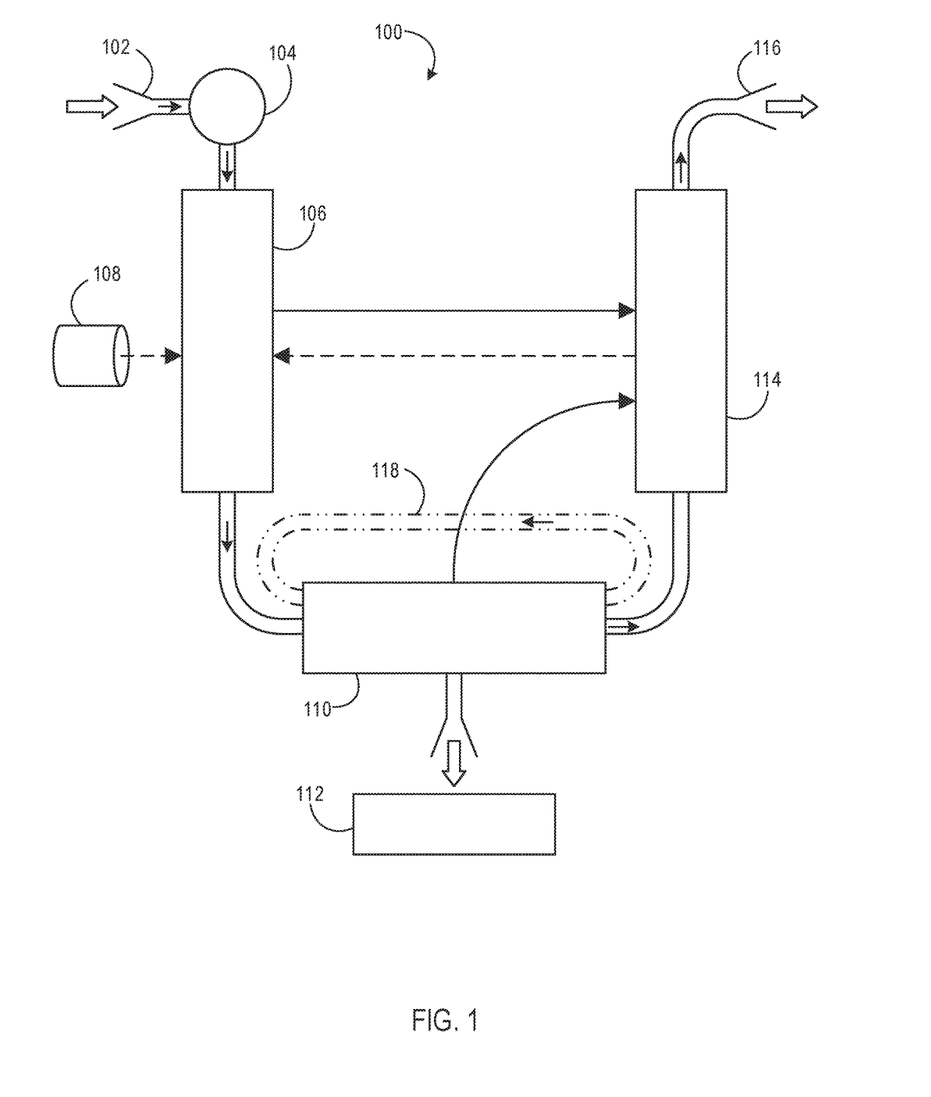
FIG. 1 illustrates an oxygen extraction system according to one embodiment.

FIG. 1 illustrates an oxygen extraction system 100 according to one embodiment. System 100 draws gaseous atmospheric air into an air intake 102 and removes humidity from the air in a dehumidifier 104. Removal of the humidity from the input air removes water vapor from the air that could easily freeze and block the process or reduce its efficiency. After drying the air in dehumidifier 104, system 100 compresses the air in a compressor 106. A motor 108 is configured to run compressor 106 to compress the gaseous air into a liquid state.

After being compressed into a liquid, the liquid air passes through a separator 110 designed to extract oxygen from the other liquid gases of the liquid air. As described below, separator 110 functions magnetically to draw the liquid oxygen from the liquid air passing through a shaped tube. The extracted liquid oxygen in this embodiment is stored in an oxygen storage tank 112 fluidly coupled to separator 110 to store the oxygen in its liquid state. The process of extracting at least a portion of the oxygen from the liquid air flowing through the separator 110 produces a liquid mixture of the liquid air having at least a portion of oxygen removed therefrom. This liquid mixture flows from the separator 110 to an expander 114 configured to expand the liquid gases into a gaseous state for ejection back into the environment through a gas outtake 116. Air intake 102 and gas outtake 116 are preferably positioned far away from each other to avoid the less-oxygenated exit air from being drawn back into oxygen extraction system 100.

As illustrated, heat generated in the compression stage via compressor 106 and in the separation stage via separator 110 is provided to expander 114 in the expansion stage. In turn, mechanical energy generated in the expansion stage is provided back to the compression stage. In this way, the shared heat and energy between the compression and expansion stages reduces the amount of external work needed to be entered into the system 100 and reduces the amount of external cooling needed to compress the intake gas. Motor 108 is provided to add mechanical energy to maintain the process continuously to overcome any energy losses in the heat and mechanical energy transfer between the stages. If needed, it is contemplated that a cooling subsystem may be incorporated to compensate for heat generated by the system 100.

The separation of oxygen from the liquid air via separator 110 in the separation stage may not completely remove all of the oxygen from the liquid air. Instead, a liquid mixture produced by separator 110 as its output may only have a portion of the oxygen removed. Accordingly, it is contemplated that system 100 may include a feedback system 118 coupled to the separator 110 to pass the liquid mixture of gases back through separator 110 one or more additional times to further extract remaining oxygen from the liquid air. Each subsequent pass of the liquid mixture produced by separator 110 is intended to remove more oxygen therefrom, thus increasing the efficiency of the system 100 in removing the oxygen.

Figure 2:
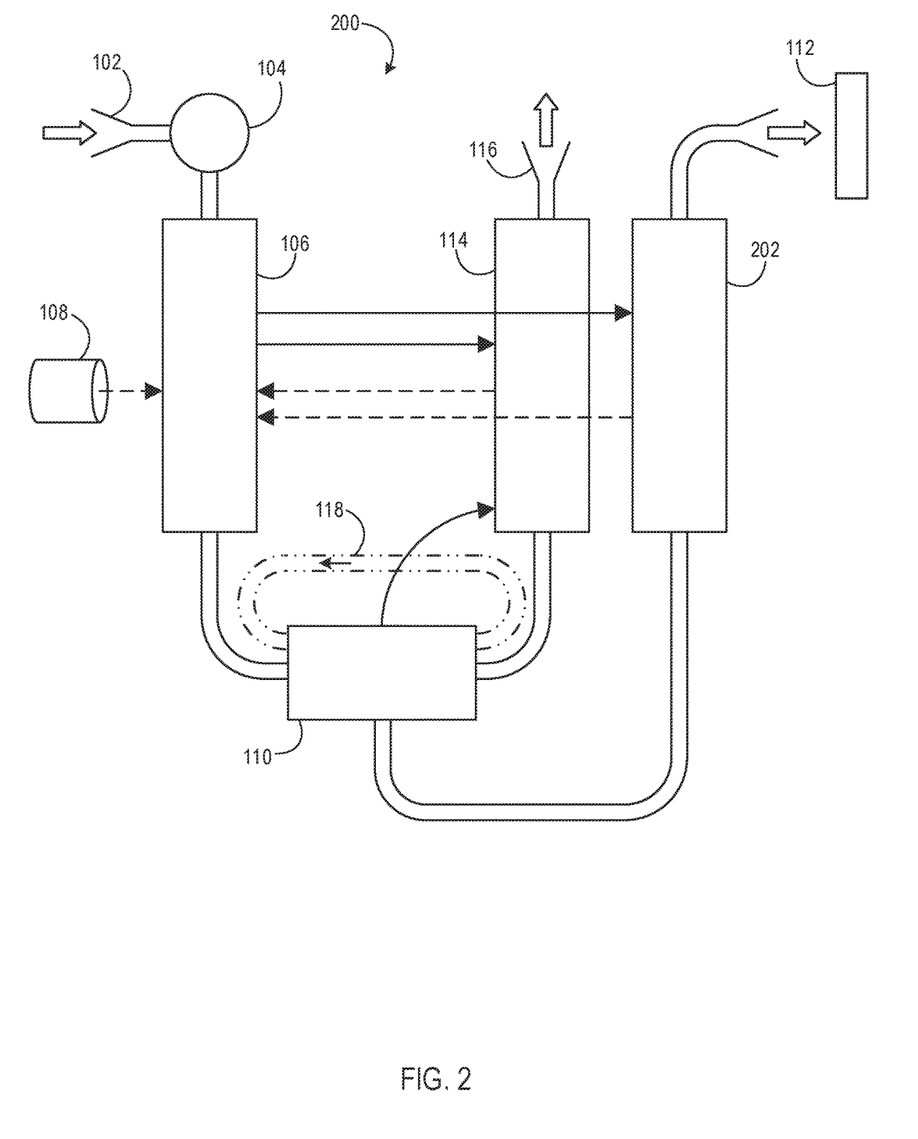
FIG. 2 illustrates an oxygen extraction system with an additional expansion stage.

FIG. 2 illustrates an oxygen extraction system 200 with an additional expansion stage. System components in common with system 100 are described above. In the embodiment shown, another expander 202 fluidly coupled to separator 110 is included and coupled to the oxygen output of separator 110 to take advantage of expanding the liquid oxygen back to its gas state to recoup more of the energy of compression and extract extra heat from the compression process. Oxygen storage tank 112 is fluidly coupled to expander 202 to store the oxygen in its gaseous state. In expander 202, the capture of energy produced via the compression and expansion stages is leveraged. Both expanders 114, 202 transfer mechanical energy back to the compressor 106 and receive heat therefrom.

In a typical concentration of air, the following gases and percentages are found: nitrogen (78.09%), oxygen (20.95%), argon (0.93%), carbon dioxide (0.03%), and water vapor (varies). The magnetic property of oxygen is paramagnetic while the magnetic properties of nitrogen, argon, carbon dioxide, and water vapor is diamagnetic. Accordingly, oxygen molecules are effectively attracted to magnetic fields while the molecules of these other gases are effectively repelled by magnetic fields. The extraction of liquid oxygen from the liquid air in embodiments herein is done by using the paramagnetic property of oxygen.

By applying a magnetic field gradient to the liquid oxygen, the oxygen separates from the other diamagnetic gases. Depending on the strength gradient of the magnetic field, the oxygen is separated with more or less speed. The larger the magnetic field gradient, the greater the efficiency at separating the oxygen. Magnetic field gradients much greater than 1 Tesla/meter are preferred. Permanent magnets of 1 Tesla (1 T) are commonly available today using available neodymium magnets that can reach an extreme field of 1.4 T, for example. However, merely placing a 1 T magnet next to liquid air will not create a large gradient on its own. To achieve the large gradient magnetic gradient, special arrangements of the magnets is used.

By using or creating a C-shaped magnet or by placing the north pole of a magnet very close to the south pole of itself or another magnet and ensuring that the magnetic tips are small enough to force the magnetic field to squeeze, large magnetic fields become available in very small spaces. This magnetic field gradient may be used in the oxygen extraction systems 100, 200 described above.

Figure 3:
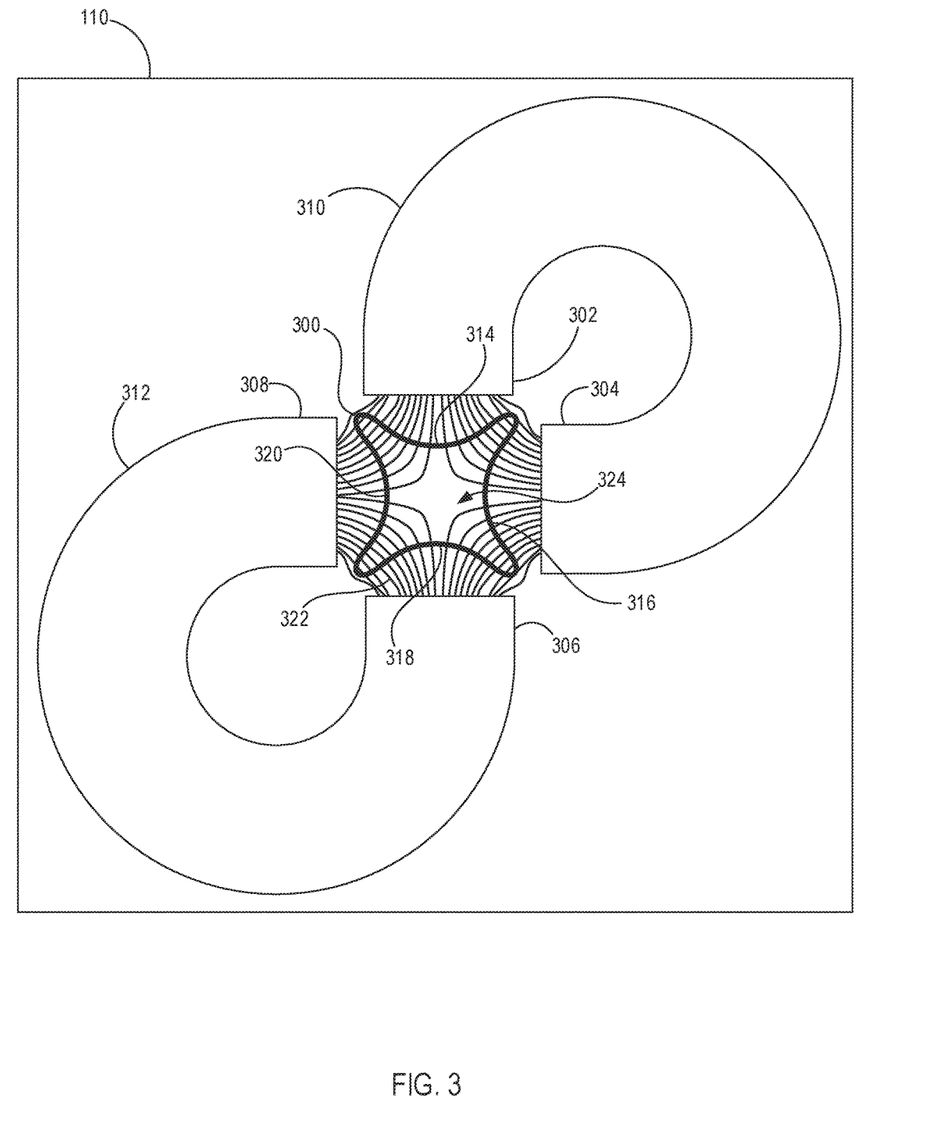
FIG. 3 illustrates a portion of the separator shown in FIGS. 1 and 2.

FIG. 3 illustrates a portion of the separator 110 of systems 100, 200. The air that has been liquefied via the compressor 106 is provided to and fed through the interior of an X-shaped tube 300 positioned between four magnet ends 302-308. In one embodiment, magnet ends 302, 304 are the respective north and south ends of a single, C-shaped magnet 310 (as shown) while magnet ends 306, 308 are the respective north and south ends of a different single, C-shaped magnet 312. As shown, magnet ends 302, 304 are respectively positioned adjacently to adjacent walls 314, 316 of tube 300, and magnet ends 302, 304 are respectively positioned adjacently to adjacent walls 318, 320 of tube 300. Alternatively, magnet ends 302-308 may be distinct, individual magnets (e.g., magnets 600, 602 in FIG. 6) with their north and south poles appropriately positioned as described herein.

Figure 4:
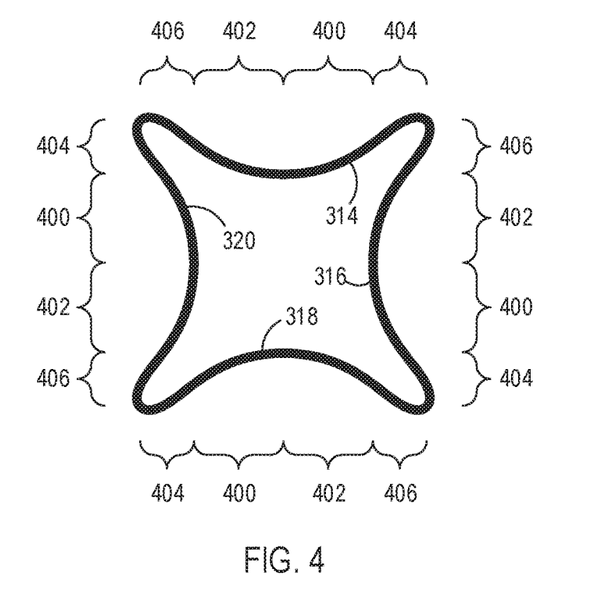
FIG. 4 illustrates an embodiment of a separator tube shown in a cross-sectional view.

FIG. 4 illustrates an embodiment of separator tube 300 shown in a cross-sectional view. As shown in this embodiment and as discussed above, tube 300 has an "X" shape. The X shape is formed by a portion of each wall 314-320 having a respective pair of concave portions 400, 402 and a respective pair of convex portions 404, 406. The arms of the X shape are formed by respective pairs of a concave portion 402 and a convex portion 406 of one wall (e.g., wall 318) together with respective pairs of a concave portion 400 and a convex portion 404 of an adjacent wall (e.g., wall 316).

Referring again to FIG. 3, the magnetic flux lines 322 that occur when placing the magnet ends 302-308 adjacently to one other are illustrated. The magnets are positioned within the gaps of the X-shape tube 300 such that the magnetic field is strongest at the limits of the arms of the X (i.e., adjacent to the apex of adjacent convex portions 404, 406). By pushing the liquid air through the interior 324 of the X-shape tube 300, the oxygen will naturally be attracted to the highest magnetic field away from the center of the tube 300 while the non-oxygen gases will not be attracted to the limits. Instead, they will be somewhat pushed out due to the higher concentration of oxygen at the extremities. Since the center of the X-shape tube 300 has the lowest gradient of magnetic field, it helps keep the diamagnetic gases in the center of the tube 300. The preferred gradient of the magnetic field needed to separate oxygen is 10 Tesla/meter, which can be achieved for short range distances with a 1 T magnet as shown. The X-shape is one of many permutations that are possible to create this 10 T/m gradient. The proposed four magnets with opposite poles towards each other can be extended to 2N count of magnetic poles, and the X-shape will be replaced by a tube with 2N arms extended between the magnets. It is also possible to arrange the magnets such that all the magnets have the same poles centered, and this arrangement can be used for even or odd numbers instead of balancing the magnetic poles in the 2N magnets. However, having all the magnets centered would create a constant force pushing the magnets away from each other adding strain to the fixture holding the magnets. Using C-shaped magnets with the opposite poles centralized reduces complexity.

Figure 5:
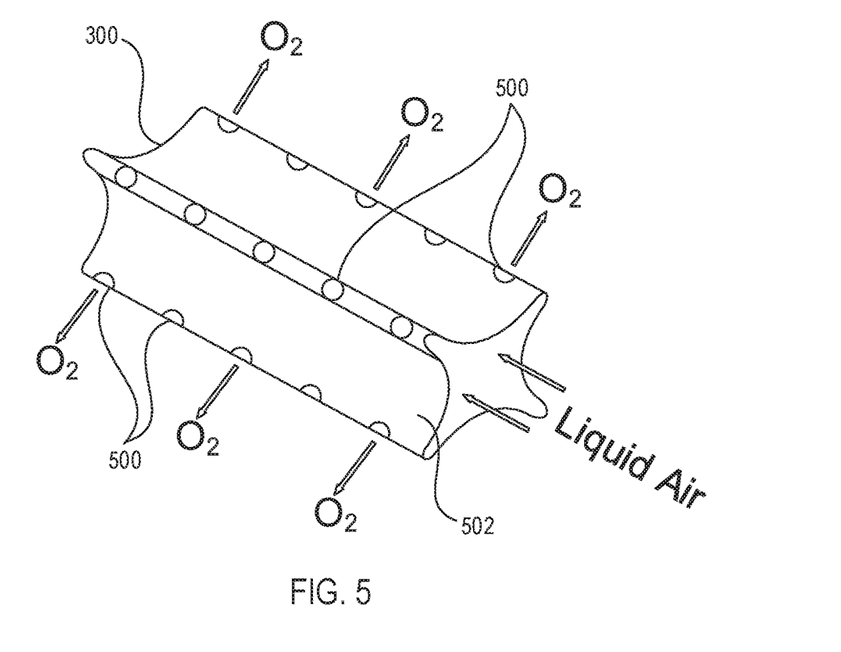
FIG. 5 illustrates an embodiment of a separator tube shown in an isometric view.

FIG. 5 illustrates an embodiment of tube 300 of separator 110 shown in an isometric view. As the concentration of oxygen mounts along the flow path of the X-shape tube 300, apertures or side exit ports 500 in a wall 502 of the X-shape tube 300 extract the pure oxygen out of the tube to a separate channel. Ports 500 may be connected to extraction tubes (shown in FIG. 6) to facilitate extraction of the oxygen. The extracted oxygen can be used in liquid form and stored in oxygen storage tank 112 as shown in FIG. 1 or expanded to a gas and stored in oxygen storage tank 112 as shown in FIG. 2, which allows the system to recoup the compression energy contained in the liquid oxygen as described above.

Figure 6:
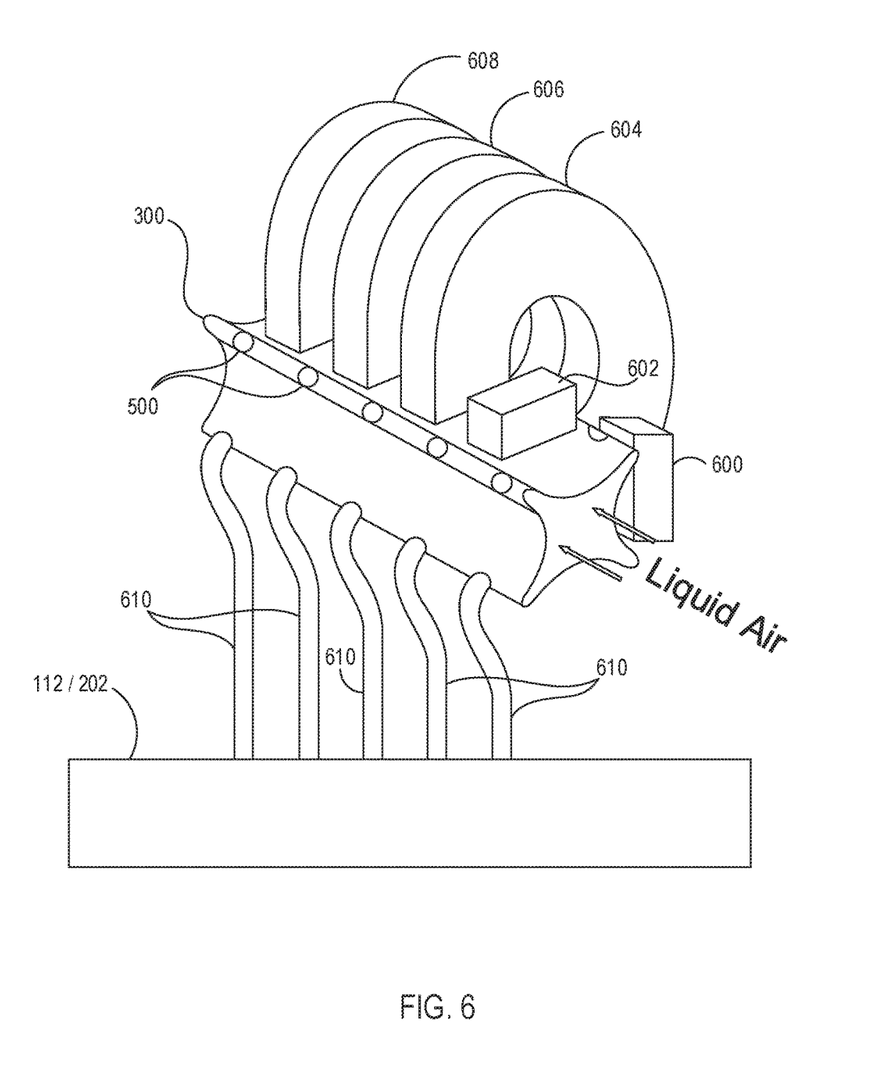
FIG. 6 illustrates an isometric view of a portion of the separator of FIG. 3 according to an embodiment.

FIG. 6 illustrates an isometric view of a portion of the separator 110 of FIG. 3 according to an embodiment. As shown, magnets 600-608 extend along the length of tube 300. Magnets 600-608 correspond to the position of magnet 310. For simplicity in the drawing, additional magnets that would be paired with magnets 600-608 and corresponding to the position of magnet 312 are not shown. However, it is to be understood that such magnets would be present in a physical system. Between magnets 600-608, the side exit ports 400 of tube 300 allow for the oxygen to be extracted. A plurality of extraction tubes 610 fluidly coupled to side exit ports 400 allow for the extracted oxygen to be provided to oxygen storage tank 112 in the case of system 100 or to be provided to expander 202 in the case of system 200.

Figure 7:
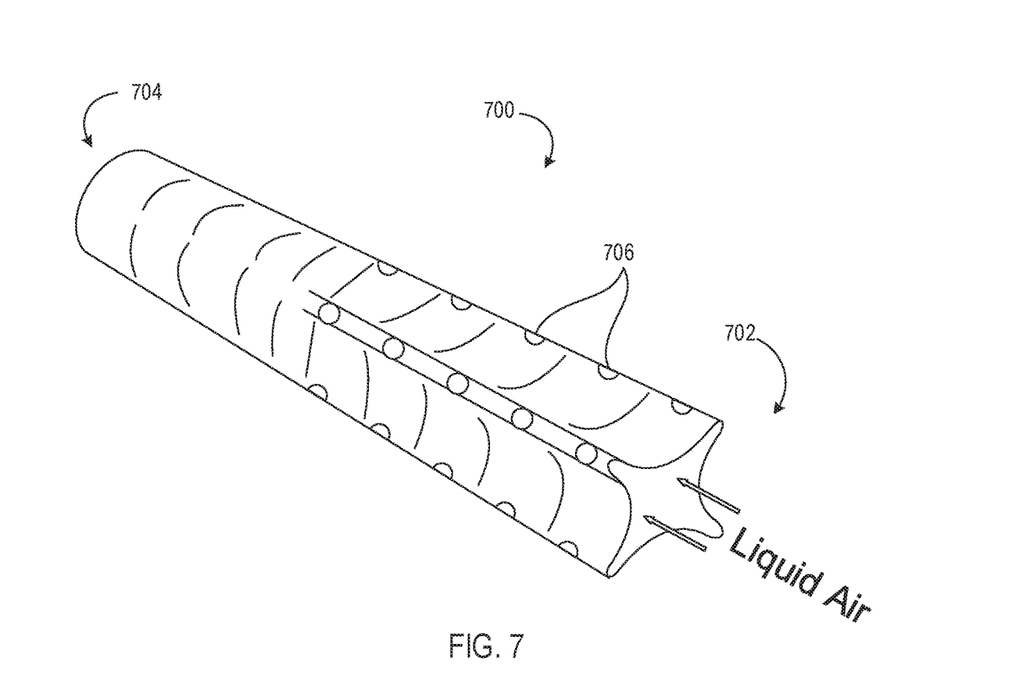
FIG. 7 shows an extraction tube according to another embodiment.

In another embodiment, FIG. 7 shows another shape of an extraction tube 700 configured to match the process as oxygen is removed from the liquid air passing therethrough. As shown, a first end 702 of tube 700 is X-shaped as described above. Along the length of tube 700 toward a second end 704, the shape transforms from an X-shape into a circular shape. In one embodiment, the area of the cross-section of second end 704 is less than the area of the cross-section of first end 702. For example, the area of the cross-section of second end 704 may be 0.8 times the area of the cross-section of first end 702 to take into account the removal of the volume of the oxygen from the liquid air as it travels along tube 700. Also, side exit ports 706 along tube 700 may diminish as the need to remove oxygen from the liquid air lessens as oxygen is removed along tube travel.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system for extracting oxygen from a liquid comprising:
    a separator configured to: allow a liquid to pass lengthwise through the separator, and produce a liquid mixture comprising the liquid having at least a portion of oxygen removed from the liquid, the separator comprising:
        a tube having a wall surrounding an interior portion of the tube, the wall having at least one aperture formed in the wall; and
        at least one magnet positioned adjacently to the at least one aperture, the at least one magnet having a north pole end and a south pole end, a magnetic field gradient being formed between the north and south pole ends of the at least one magnet and extending into an interior portion of the tube; and
    a storage tank fluidly coupled to the at least one aperture and configured to store the at least a portion of oxygen removed from the liquid via the separator.

2. The system of claim 1 wherein the liquid comprises liquid air.

3. The system of claim 1 wherein the at least one magnet is configured to form the magnetic field gradient as a 10 Tesla/meter magnetic field gradient.

4. The system of claim 3 wherein the at least one magnet comprises a 1 Tesla magnet.

5. The system of claim 1 further comprising a feedback system coupled to the separator and configured to supply the liquid mixture back to the separator to have an additional amount of oxygen removed from the liquid mixture.

6. The system of claim 1 wherein the storage tank is further configured to store the at least a portion of oxygen removed from the liquid in a liquid state.

\* \* \* \* \*